US008744263B2

(12) United States Patent
Öhlén et al.

(10) Patent No.: US 8,744,263 B2
(45) Date of Patent: Jun. 3, 2014

(54) WDM-PON SYSTEM, ONT, OLT AND METHOD FOR INITIALIZATION OF TUNABLE LASER

(75) Inventors: Peter Öhlén, Stockholm (SE); Stefan Dahlfort, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 379 days.

(21) Appl. No.: 13/132,536

(22) PCT Filed: Dec. 1, 2009

(86) PCT No.: PCT/IB2009/007616
§ 371 (c)(1),
(2), (4) Date: Jun. 2, 2011

(87) PCT Pub. No.: WO2010/064119
PCT Pub. Date: Jun. 10, 2010

(65) Prior Publication Data
US 2011/0229140 A1  Sep. 22, 2011

Related U.S. Application Data

(60) Provisional application No. 61/119,087, filed on Dec. 2, 2008.

(51) Int. Cl.
*H04J 14/00* (2006.01)
(52) U.S. Cl.
USPC .................................. 398/70; 398/71; 398/72
(58) Field of Classification Search
USPC .......................................... 398/58, 63, 66–72
See application file for complete search history.

(56) References Cited

U.S. PATENT DOCUMENTS

| 6,108,112 A * | 8/2000 | Touma ............................ 398/10 |
| 6,411,410 B1 * | 6/2002 | Wright et al. ................... 398/79 |
| 6,504,630 B1 * | 1/2003 | Czarnocha et al. ............ 398/15 |
| 2004/0264514 A1 | 12/2004 | Kim |
| 2005/0123300 A1 | 6/2005 | Kim et al. |
| 2007/0133986 A1 | 6/2007 | Lee et al. |
| 2008/0089699 A1 | 4/2008 | Li et al. |
| 2008/0267627 A1 | 10/2008 | Effenberger |

FOREIGN PATENT DOCUMENTS

| KR | 2007/059895 A | 6/2007 |
| WO | WO 03/073148 A1 | 9/2003 |
| WO | WO 2008/069456 A1 | 6/2008 |

OTHER PUBLICATIONS

Infonetics: Asia-Pacific PON Vendors See Sale Jump 50%. Dec. 20, 2007. Retrieved from the Internet: http://lightwaveonline.com/business/market-research/infoetics-asia-pacific-pon-see-sales-jump-50-53443262.html.
ABI Research Forecasts FTTH Expansion in APAC. Jan. 3, 2008. Retrieved from the Internet: http://lightwaveonline.com/business/market-research/abi-research-forecasts-ftth-expansion-in-apac-54883677.html.

(Continued)

*Primary Examiner* — Dzung Tran

(57) ABSTRACT

A wavelength-multiplexed passive optical network (WDM-PON) and a method are described herein for setting-up (e.g., wavelength tuning, power tuning) an ONT laser by establishing a communications channel on an optical layer between an optical line terminal (OLT) and an optical network termination (ONT). The communications channel is established by utilizing the OLT's laser shutdown function and the ONT's signal detection function.

26 Claims, 2 Drawing Sheets

(56) References Cited

OTHER PUBLICATIONS

RVA Forecasts Significant Future Growth for North American FTTH Market. Jan. 3, 2008. Retrieved from the Internet: http://lightwaveonline.com/business/market-research/rva-forecasts-significant-future-growth-for-north-american-ftth-market -54883652.html.

Larsson, S et al. Simple Optical Neighbor Discovery (SOND): Architecture, Applications, and Experimental Verification. Optical Society of America. Oct. 2003 / vol. 2, No. 10/ Journal of Otpical Networking. Sep. 2, 2003.

* cited by examiner

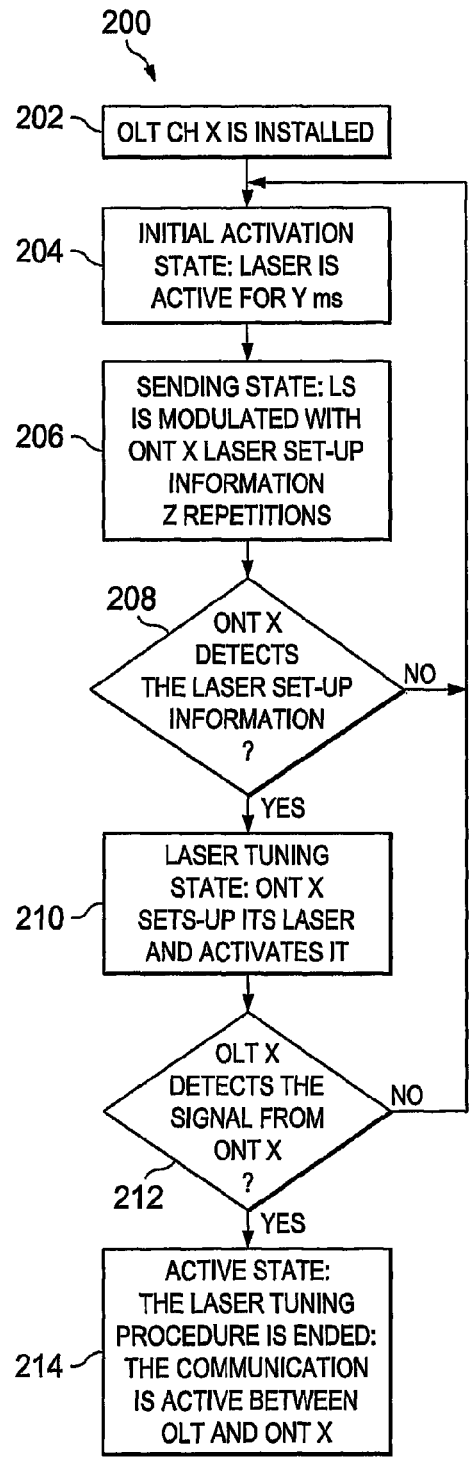
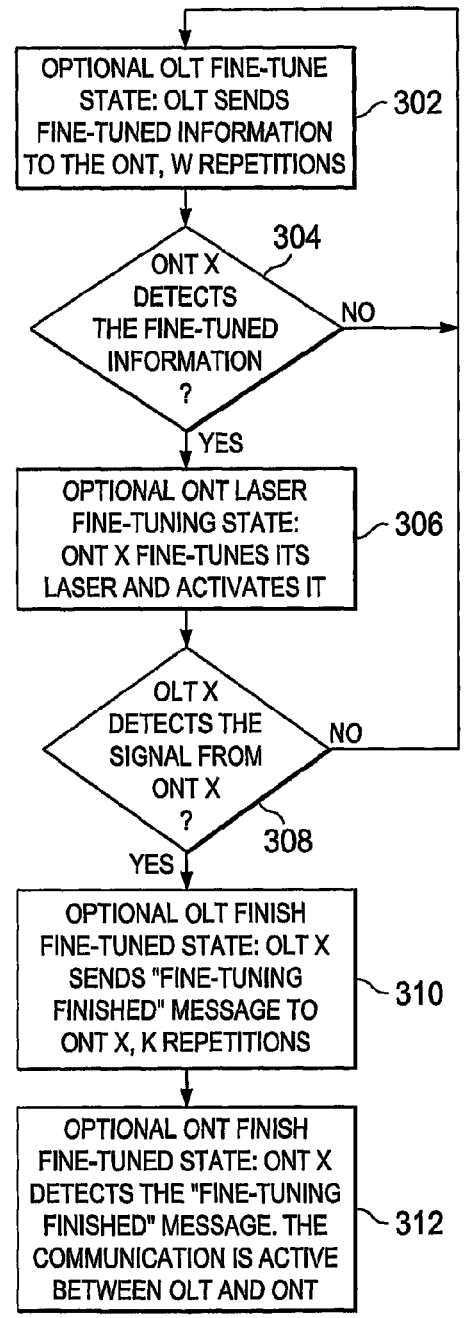
FIG. 2
FIG. 3

WDM-PON SYSTEM, ONT, OLT AND METHOD FOR INITIALIZATION OF TUNABLE LASER

CLAIM OF PRIORITY

This application claims the benefit of U.S. Provisional Application No. 61/119,087, filed Dec. 2, 2008, the disclosure of which is fully incorporated herein by reference.

TECHNICAL FIELD

The present invention relates in general to a wavelength-multiplexed passive optical network (WDM-PON) and a method for setting-up (e.g., wavelength tuning, power tuning) an ONT laser by establishing a communications channel on an optical layer between an optical line terminal (OLT) and an optical network termination (ONT). The communications channel is established by utilizing the OLT's laser shutdown function and the ONT's signal detection function.

BACKGROUND

The following abbreviations are herewith defined, at least some of which are referred to within the following description of the prior art and the present invention.
AWG Arrayed Waveguide Grating
DS Downstream, from OLT to ONT(s)
EPON Ethernet Passive Optical Network
FTTH Fiber-to-the-Home
GPON Gigabit-Capable Passive Optical Network
ONT Optical Network Termination
ONU Optical Network Unit
PON Passive Optical Network
Rx Receiver
SDH Synchronous Digital Hierarchy
TDM Time Division Multiplexing
TDMA Time Division Multiple Access
TRx Transceiver
Tx Transmitter
US Upstream, from ONT(s) to OLT
WDM Wavelength Division Multiplexing The current fiber-optic communication networks are reaching closer to the end-users at an ever increasing pace and with ever increasing bandwidths. Ultimately, these fiber-optic communication networks will reach all the way to the subscriber, i.e. fiber to the home (FTTH). Currently, these so-called fiber-to-the-x networks (x being home, building, curb etc.) can be realized with point-to-point (p2p) dedicated fibers to each end-user or with point-to-multipoint (p2 mp) passive optical networks (PONs) to multiple end-users. PONs are further divided into time-division multiplexed (TDM) PONs and wavelength-multiplexed (WDM) PONs or hybrids thereof. Examples of TMD-PONs are GPON and EPON. The term passive in PON comes from the fact that a passive splitter is used to achieve the p2 mp function between the central office equipment (optical line terminal, OLT) and the end-users (optical network termination, ONT). The passive splitter for the TDM-PONs is a power splitter while for the WDM-PONs the passive splitter is a wavelength splitter, often of the arrayed waveguide grating (AWG) type.

The WDM-PON when compared to the TDM-PON has several advantages (for example): (1) dedicated bandwidth to each end-user; and (2) communication privacy and much lower insertion loss when using the AWG splitter when compared to the TDM-PON's power splitter, which enables long reach. However, the WDM-PON has a major disadvantage in that each ONT must transmit at a specific wavelength. Since the logistics of having 32, 64 or more types of ONTs is not practical, wavelength adaptive ONT transmitters must be used. These types of ONTs are typically referred to as "colorless" ONTs. Contrary to the complexity of the multitude of WDM-PON architectures that have been proposed, the use of tunable lasers is widely considered as the best long term solution. However, apart from their current relative high cost, the problem of automatic tuning the ONT's laser transmitters must be solved. Once put into service, the ONT's laser transmitters must get the knowledge of what wavelength they should use for the upstream (US) communication with the OLT receivers.

There have been several reported solutions which can address the problem of tuning the US wavelength of ONT's laser transmitters. In one reported solution, higher layer communications are used between the OLT and ONT in which a downstream channel carries control information over an Ethernet link informing the ONT of which wavelength the ONT laser transmitter should use for the US communications. This reported solution has a drawback where it is id protocol specific and cannot be used when the Ethernet functionality (or some other layer 2 protocol) is not present, active or suitable for this type of management information. Plus, this reported solution cannot be used if the ONT only utilizes an optical layer 1. Also, the wavelength tuning functionality of the ONT laser transmitter is clearly an optical layer 1 issue thus it could be argued that this functionality should be handled at layer 1 and not at some layer 2 protocol.

In another reported solution, a method has been proposed where the ONT laser transmitter just tests every US wavelength until it receives information that indicates the ONT laser transmitter's signal has been received at the OLT. This reported solution has several disadvantages in that it has high power consumption, it is quite slow (e.g., 1 minute), and it risks corrupting the US communications of the other ONTs if the isolation of the AWG wavelength splitter (or other wavelength splitter) is inadequate. Accordingly, there has been a need to address the current WDM-PONs shortcoming associated with not being able to effectively wavelength tune or otherwise set-up an ONT laser transmitter. This need and other needs are addressed by the present invention.

SUMMARY

In one object of the present invention there is provided a WDM-PON for setting-up (e.g., wavelength tuning, power tuning) an ONT laser. In one embodiment, the WDM-PON includes an OLT and an ONT where the OLT is coupled to the ONT by one or more wavelength splitters. Each ONT has an ONT controller and an optical port which has an ONT transmitter and an ONT receiver. The ONT transmitter includes an ONT laser. The ONT receiver includes an ONT Signal detect function. The OLT has an OLT controller and an optical port which has an OLT receiver and an OLT transmitter. The OLT transmitter includes an OLT laser and a Laser shutdown function. In this set-up, if the OLT controller deactivates the Laser shutdown function then the OLT laser is turned-on and provides an optical power which corresponds to a logical level 1 at the ONT Signal detect function. If the OLT controller activates the Laser shutdown function then the OLT laser is turned-off and provides an optical power which corresponds to a logical level 0 at the ONT Signal detect function. Thus, the OLT controller is able to activate and deactivate the Laser shutdown function in a predetermined sequence to generate laser set-up information. The wavelength splitter(s) transport the laser set-up information on a communications channel over an optical layer from the OLT to the ONT, where the communication channel was established by the Laser shutdown function and the ONT Signal detect function. The ONT controller monitors the ONT Signal detect function to detect the laser set-up information and then uses the laser set-up information to set-up the ONT laser. In this way, the problem of setting-up (e.g., automatic wavelength tuning) the ONT laser is effectively solved in an advantageous manner from the OLT side of the WDM-PON.

In another object of the present invention there is provided a method for setting-up an ONT laser by establishing a communications channel on an optical layer in a WDM-PON. The WDM-PON includes an OLT and an ONT where the OLT is coupled to the ONT by one or more wavelength splitters. Each ONT has an ONT controller and an optical port which has an ONT transmitter and an ONT receiver. The ONT transmitter includes an ONT laser. The ONT receiver includes an ONT Signal detect function. The OLT has an OLT controller and an optical port which has an OLT receiver and an OLT transmitter. The OLT transmitter includes an OLT laser and a Laser shutdown function. In this set-up, if the OLT controller deactivates the Laser shutdown function then the OLT laser is turned-on and provides an optical power which corresponds to a logical level 1 at the ONT Signal detect function. If the OLT controller activates the Laser shutdown function then the OLT laser is turned-off and provides an optical power which corresponds to a logical level 0 at the ONT Signal detect function. The method includes the steps of: (a) generating laser set-up information by having the OLT controller activate and deactivate the Laser shutdown function in a predetermined sequence; (b) transporting the laser set-up information on the communication channel over the optical layer via the at least one wavelength splitter, where the communication channel was established by the Laser shutdown function and the ONT Signal detect function; (c) receiving the laser set-up information by having the ONT controller monitor the ONT Signal detect function; and (d) using the received laser set-up information to set-up the ONT laser. In this way, the problem of setting-up (e.g., automatic wavelength tuning) the ONT laser is effectively solved in an advantageous manner from the OLT side of the WDM-PON.

In yet another object of the present invention there is provided an OLT for setting-up an ONT laser within an ONT. In one embodiment, the OLT includes an OLT controller and an optical port which includes an OLT receiver and an OLT transmitter. The OLT transmitter includes an OLT laser and a Laser shutdown function. In this set-up, if the OLT controller deactivates the Laser shutdown function then the OLT laser is turned-on and provides an optical power which corresponds to a logical level 1 at the ONT Signal detect function. If the OLT controller activates the Laser shutdown function then the OLT laser is turned-off and provides an optical power which corresponds to a logical level 0 at the ONT Signal detect function. Thus, the OLT controller is able to activate and deactivate the Laser shutdown function in a predetermined sequence to generate laser set-up information which is transported on a communications channel over an optical layer to the ONT, where the communication channel was established by the Laser shutdown function and the ONT Signal detect function. The ONT monitors the ONT Signal detect function to detect the laser set-up information and then uses the laser set-up information to set-up the ONT laser. In this way, the problem of setting-up (e.g., automatic wavelength tuning) the ONT laser is effectively solved in an advantageous manner from the OLT side of the WDM-PON.

In still yet another object of the present invention there is provided an ONT for setting-up an ONT laser by interacting with an OLT. In one embodiment, the ONT includes an ONT controller and an optical port which has an ONT transmitter which includes an ONT laser and an ONT receiver which includes an ONT Signal detect function. In this set-up, the ONT controller monitors the ONT Signal detect function to detect laser set-up information that was generated by the OLT when an OLT controller activated and deactivated a Laser shutdown function in a predetermined sequence to respectively turn-off an OLT laser and turn-on the OLT laser to generate the laser set-up information. The ONT controller uses the detected laser set-up information to set-up the ONT laser. In this way, the problem of setting-up (e.g., automatic wavelength tuning) the ONT laser is effectively solved in an advantageous manner from the OLT side of the WDM-PON.

Additional objects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIG. 2 is a flowchart illustrating the steps of a method for setting-up an ONT laser in accordance with an embodiment of the present invention; and FIG. 3 is a flowchart illustrating some additional steps that can be implemented with the method shown in FIG. 2 for fine-tuning the set-up of the ONT laser in accordance with another embodiment of the present invention.

DETAILED DESCRIPTION

Figure 1:
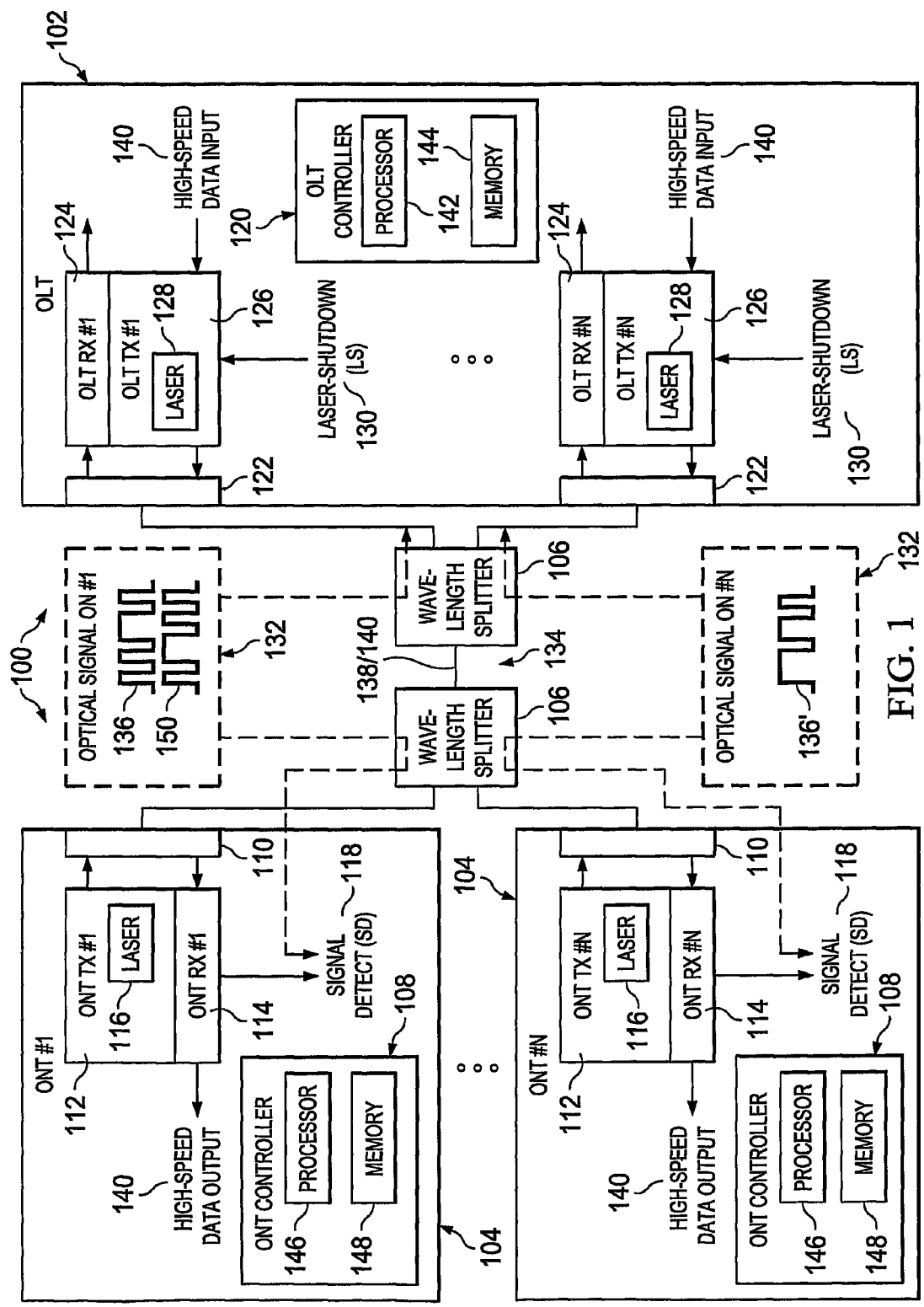
FIG. 1 is a diagram of an exemplary WDM-PON in accordance with an embodiment of the present invention.

Referring to FIG. 1, there is a block diagram illustrating an exemplary WDM-PON 100 in accordance with an embodiment of the present invention. As shown, the WDM-PON 100 includes an OLT 102 and one or more ONTs 104 (ONT#1 ... ONT#N) where the OLT 102 is coupled to the ONTs 104 by one or more wavelength splitters 106. Each ONT 104 has an ONT controller 108 and an optical port 110 with an ONT transmitter 112 and an ONT receiver 114. Each ONT transmitter 112 includes an ONT laser 116. Each ONT receiver 114 includes an ONT Signal detect function 118. The OLT 102 has an OLT controller 120 and one or more optical ports 122 where each optical port 122 has an OLT receiver 124 and an OLT transmitter 126. Each OLT transmitter 126 includes an OLT laser 128 and a Laser shutdown function 130. For clarity, the discussion below describes how the OLT 102 (e.g., OLT RX#1, OLT TX#1) interacts with one ONT 104 (e.g., ONT#1) to set-up, initialize or tune the respective ONT laser 116. However, it should be readily appreciated that the same scheme can be used to set-up, initialize or tune either serially or in parallel the other ONT lasers 116 in anyone or all of the other ONTs 104 (e.g., ONT#N).

The ONT laser 116 is set-up, initialized or tuned in the ONT 104 (e.g., ONT#1) by establishing a communications channel 132 on an optical layer 134 (which includes active and passive optical components and not just fiber) where the communications channel 132 is established by using the Laser shutdown function 130 at the OLT 102 and the ONT Signal detect function 118 at the ONT 104 (e.g., ONT#1). The communication channel 132 is able to be established in the first place because the OLT transmitter 126 has two states where one is an on-state in which the Laser shutdown function 130 is deactivated and the OLT laser 128 is active and the other is an off-state in which the Laser shutdown function 130 is activated and the OLT laser 128 is shut-down. In particular, if the OLT controller 120 deactivates the Laser shutdown function 130 then the OLT laser 128 is turned-on and provides an optical power above a threshold value which corresponds to a logical level 1 at the ONT Signal detect function 118. If the OLT controller 120 activates the Laser shutdown function 130 then the OLT laser 128 is turned-off and provides an optical power below the threshold value which corresponds to a logical level 0 at the ONT Signal detect function 118.

Thus, the OLT controller 108 is able to activate and deactivate the Laser shutdown function 130 in a predetermined sequence to generate laser set-up information 136. In other words, if the OLT laser 128 is turned-off then the optical power or modulation is zero and the ONT Signal detection function 118 at the ONT receiver 114 will be false (logic 0), which corresponds to transmitting a zero. Alternatively, the power or modulation of the OLT laser 128 can be reduced to provide a received power below the threshold value such that the ONT Signal detection function 118 at the ONT receiver 114 will also be false (logic 0). If the OLT laser 128 at the OLT transmitter 126 is turned-on then the optical power or modulation is above the threshold value (provided that the transmission distance does not attenuate too much, that is the fiber functions) and the ONT Signal detection function 118 at the ONT receiver 114 will be true (logic 1), which corresponds to transmitting a one. Naturally, a data speed and coding protocol would be determined in advance and used by the ONT controller 108 and the OLT controller 120 before the laser set-up information 136 would be sent on the communications channel 132 between the OLT 102 and the ONT 104.

In operation, the OLT controller 108 would activate and deactivate the Laser shutdown function 130 in a predetermined sequence according to the coding protocol to generate the laser set-up information 136. As shown, the laser set-up information 136 sent from the OLT 102 (e.g., OLT TX#1) to the ONT 104 (ONT#1) has an optical signal with "1"s and "0"s in a different sequence than an optical signal associated with the laser set-up information 136' sent from the OLT 102 (OLT TX#1) to the ONT 104 (ONT#N). The different optical signals are needed to transmit different laser set-up information 136 and 136' to the different ONTs 104 (ONT#1 . . . ONT#N).

The communications channel 132 is used for initial control functions such as setting-up the ONT laser 116 prior to establishing the actual bi-directional high-speed data communications. The communications channel 132 cannot be used at the same time as the high-speed data channel 138 on which regular high-speed data 140 is transmitted. However, the communications channel 132 (defined by the use of Laser shutdown function 130 and ONT Signal detection function 118) makes use of the same physical hardware and same optical signal link as the high-speed data channel 138, but it is logically different and these two logically separated channels cannot operate at the same time since during the logical channel off state (OLT laser 128 disabled) the high-speed data channel 138 is disabled as well. As the time-scale of the ONT Signal detection function 118 is in the order of 100 microseconds, the laser set-up information 136 would be transmitted at a maximum data rate of 1 kb/s so as not be confused with the ordinary Gigabit/s communication of the high-speed data 140.

In one embodiment, the ONT-laser set-up procedure can be summarized as follows: upon the event of an OLT transmitter 126 (e.g., OLT Tx#1) being put in service the OLT controller 108 including a processor 142 and a memory 144 which stores processor-executable instructions where the processor 142 interfaces with the memory 144 and executes the processor-executable instructions is able to activate and deactivate the new OLT transmitter's Laser shutdown function 130 in a predetermined sequence to generate laser set-up information 136. The wavelength splitter(s) 106 transports the laser set-up information 136 on the communications channel 132 (defined by the use of Laser shutdown function 130 and ONT Signal detection function 118) over the optical layer 134 from the OLT 102 (e.g., OLT TX#1) to the ONT 104 (e.g., ONT #1). The ONT controller 108 including a processor 146 and a memory 148 which stores processor-executable instructions where the processor 146 interfaces with the memory 148 and executes the processor-executable instructions is able to monitor the ONT Signal detect function 118 (at ONT port 110) and detect the laser set-up information 136 assuming that there is an active laser signal at an acceptable power level (i.e., above the ONT receiver 114 sensitivity of some pre-set level). Then, the ONT controller 108 uses the laser set-up information 136 to set-up the ONT laser 116. For instance, the ONT controller 108 can use the laser set-up information 136 to set-up the correct wavelength of the ONT laser 116. Or, the ONT controller 108 can use the laser set-up information 136 to set-up the initial optical power of the ONT laser 116. Upon completion of the ONT laser set-up procedure, the normal communications begin where the high speed data 140 is transmitted on the high-speed data communications channel 138.

A detailed discussion about an exemplary WDM-PON laser automatic wavelength tuning method in accordance with an embodiment of the present invention is provided next with respect to FIGS. 2 and 3.

Referring to FIG. 2, there is a flowchart illustrating the steps of a method 200 for setting-up a wavelength of the ONT laser 116 in accordance with an embodiment of the present invention. Beginning at step 202, the OLT receiver 124 and the OLT transmitter 126 (including the OLT laser 128) associated with channel X are initialized in the OLT 102. At step 204 (initial activation state), the OLT controller 120 deactivates the Laser shutdown function 130 to activate the OLT laser 128 for a predetermined amount of time (Y ms). At step 206 (sending state), the OLT controller 120 modulates the OLT laser 128 by turning it on and off in a predetermined sequence (and predetermined times) using the Laser shutdown function 130 to generate the laser set-up information 136 (US wavelength). Since, it may not be known that a particular ONT 104 (e.g., ONT#1) is installed and active on channel X the OLT controller 120 may repeat the generation and sending of the laser set-up information 136 (US wavelength).

At step 208, the ONT controller 108 either detects or does not detect the laser set-up information 136 using the ONT Signal detection function 118. If the result of step 208 is no, then step 204 is repeated by the OLT controller 120 but to generate and communicate different laser set-up information 136. However, the OLT controller 120 needing to generate different laser set-up information 136 is not likely in the wavelength tuning scenario since it is assumed that the OLT controller 120 knows which US wavelength (laser set-up information 136) belongs to the specific DS channel X. If the result of step 208 is yes, then the ONT controller 108 at step 210 (laser tuning state) uses the laser set-up information 136 to tune (e.g., wavelength) the ONT laser 116. Thereafter, the ONT controller 108 activates the newly tuned ONT laser 116.

At step 212, the OLT controller 120 either detects or does not detect the signal from the newly tuned ONT laser 116. If the result of step 212 is no, then step 204 is repeated by the OLT controller 120 to generate and communicate different laser set-up information 136. The OLT controller 120 may set a limit to the number of times steps 204-212 can be repeated since otherwise if there was a hardware failure or some other type of failure this may cause an infinite loop of steps 204-212. If the result of step 212 is yes, the OLT controller 120 at step 214 (active state) ends the laser set-up procedure and the high-speed data channel 138 is now used to transfer high-speed data 140 on channel x between the OLT 102 (e.g., OLT RX#1, OLT TX#1) and the ONT 104 (e.g., ONT #1). The same steps 202-214 would be performed to set-up the ONT lasers 116 within the other ONTs 104 (e.g., ONT#N).

Referring back to step 206, there are two exemplary ways that the OLT controller 120 can encode laser set-up information 136 which is associated with US wavelength. The first encoding method assumes that the ONT 104 has a discrete number of wavelength states (corresponding to the number of US cannels it must be able to tune to), i.e. discretely tuned ONT 104. Since, the number of wavelengths used in the WDM-PON 100 is not likely to exceed 256, a short 1-byte (8 bits) field could be used to indicate the desired wavelength. The second encoding method may be used if the ONT 104 has a continuous number of tuning states, i.e., is continuously tuned, then the wavelength tuning information 136 would correspond to the tuning current(s), temperature or similar. In the second encoding method, the wavelength tuning information 136 from OLT 102 to ONT 104 would be a digital representation of a tuning voltage (for instance) needed to produce a certain wavelength. As an example: if OLT 102 knows that the tuning voltage of 3.205V produces a certain wavelength and the full voltage range is 0-4.000V (i.e. 4000 values if the desired accuracy is 0.001V) then 12 bits are needed ($2^{12}$=4096) which results in ~1 bit/0.001V. Thus, the wavelength tuning information 136 sent to the ONT 104 would be the value 3205 in binary form, i.e. 1100 1000 0101. In the second encoding method, more bits and possible multiple frame fields are likely needed. For interoperability and partitioning of functionality, the first encoding method is probably preferred since it does not need to take into account details of the tunable laser technology (e.g., tuning currents, temperature).

The setting-up of the ONT laser 116 utilizing method 200 can be completed in a relatively short time when compared to the previously discussed reported solutions associated with the prior art. For instance, if the initial activation state (step 204) of the OLT channel X is 10 ms and the laser set-up information 136 (wavelength information 136) is in the form of a byte (8 bits) at 1 kb/s and is repeated 3 times, then the whole tuning procedure assuming a discrete ONT wavelength encoding scheme could take 54 ms plus setting times of a few ms. Adding more bits (e.g., 4 bytes) to the laser set-up information 136 (wavelength information 136) to implement the continuous tuning encoding scheme would maybe extend the total time up to 126 ms plus setting times of a few ms (where 4 byte frames is likely more than needed).

Referring to FIG. 3, there is a flowchart illustrating some additional steps that can be implemented with method 200 for fine-tuning the ONT laser 116 in accordance with another embodiment of the present invention. In the discussion below, it is assumed that the wavelength tuning version of method 200 will be extended to allow for the fine tuning of the wavelength of ONT laser 116 but a similar process can be used to fine tune the initial power or other set-up parameters of the ONT laser 116. Beginning at step 302 (optional OLT fine-tune state), the OLT controller 120 modulates the OLT laser 128 (OLT TX#1) by turning it on and off in a predetermined sequence (and predetermined times) using the Laser shutdown function 130 to generate and communicate fine-tuned laser set-up information 150 (see FIG. 1). At step 304, the ONT controller 108 (e.g., ONT#1) either detects or does not detect the fined-tuned laser set-up information 150 using the ONT Signal detection function 118. If the result of step 304 is no, then step 304 is repeated by the OLT controller 120 to generate and communicate the fine-tuned laser set-up information 150. If the result of step 304 is yes, then the ONT controller 108 at step 306 (optional ONT laser fine-tuning state) uses the fined-tuned laser set-up information 150 to further tune the wavelength (or power) of the ONT laser 116. Thereafter, the ONT controller 108 activates the fine-tuned ONT laser 116.

At step 308, the OLT controller 120 either detects or does not detect the signal from the fine-tuned ONT laser 116. If the result of step 308 is no, then step 302 is repeated by the OLT controller 120 to generate and communicate fine-tuned laser set-up information 150. If the result of step 308 is yes, then the OLT controller 120 at step 310 (optional OLT finish fine-tune state) modulates the OLT laser 128 by turning it on and off in a predetermined sequence using the Laser shutdown function 130 to repeatedly generate and communicate a "fine-tuning finished" message. At step 312 (optional ONT finish fine-tune state), the ONT controller 108 detects the "fine-tuning finished" message and the high speed data channel 138 is now used to transfer high speed data 140 on channel x between the OLT 102 and the ONT 104 (e.g., ONT #1). The same steps 302-314 could be performed to fine-tune the ONT lasers 116 within the other ONTs 104 (e.g., ONT#N).

After the tuning process or the fine-tuning process is complete, if the wavelength (or power) of the ONT laser 116 drifts away from the proper one such that the received power at the OLT 102 falls below the Rx sensitivity, then the downstream high-speed data 140 could be interrupted to allow signaling on the communication channel 132 as described-above to re-tune the ONT laser 116. In this case, the whole tuning procedure or alternatively just the fine tuning part could be re-done. Plus, the fine-tuning process can be used in both the discrete and continuous encoding cases as well as combinations of discrete and continuous case (e.g. first discrete then continuous etc). The fine-tuning process would of course increase the total time of the tuning process.

From the foregoing, one skilled in the art will appreciate that the present invention is aimed, at least, to minimize the aforementioned drawbacks associated with the prior art and to provide for an efficient way to wavelength tune or otherwise set-up or initialize an ONT laser transmitter. The present invention has at least the following advantages:

(1) The Signal detection function 118 and the Laser shutdown function 130 are typically supported by existing optical modules and chipsets for different communication protocols.

(2) The OLT 102 and ONTs 104 can create and use the communication channel 132 independent of the regular communication protocol, which means that different communication protocols can co-exist within the WDM-PON 100, e.g. 1GbE, SDH, 10GbE.

(3) The OLT 102 and ONTs 104 use of the communication channel 132 keeps the setting-up process at layer one (optical layer) which is independent of the protocols that are subsequently used over the link to transmit the regular high-speed data 140.

(4) The tuning method could potentially be optimized to be completed in less than 50 ms if needed.

(5) The tuning method can also be used for other initial control/management functions, such as informing the ONT Tx on initial laser optical output power (if this is settable).

Although one embodiment of the present invention has been illustrated in the accompanying Drawings and described in the foregoing Detailed Description, it should be understood that the invention is not limited to the disclosed embodiment, but instead is also capable of numerous rearrangements, modifications and substitutions without departing from the present invention that as has been set forth and defined within the following claims.

The invention claimed is:

1. A wavelength-multiplexed passive optical network (WDM-PON) comprising:
   an optical network termination (ONT) comprising an ONT controller and an optical port which has an ONT transmitter and an ONT receiver, where the ONT transmitter comprises an ONT laser and the ONT receiver comprises an ONT Signal detect function;
   at least one wavelength splitter;
   an optical line terminal (OLT) comprising an OLT controller and an optical port which has an OLT receiver and an OLT transmitter where the OLT transmitter comprises an OLT laser and a Laser shutdown function, wherein when the OLT controller deactivates the Laser shutdown function then the OLT laser is turned-on and provides an optical power which corresponds to a logical level 1 at the ONT Signal detect function, wherein when the OLT controller activates the Laser shutdown function then the OLT laser is turned-off and provides an optical power which corresponds to a logical level 0 at the ONT Signal detect function;
   the OLT controller activates and deactivates the Laser shutdown function in a predetermined sequence to generate laser set-up information;
   the at least one wavelength splitter transports the laser set-up information on a communications channel over an optical layer from the OLT to the ONT, where the communication channel was established by the Laser shutdown function and the ONT Signal detect function;
   the ONT controller monitors the ONT Signal detect function to detect the laser set-up information, and
   the ONT controller uses the laser set-up information to set-up the ONT laser.

2. The WDM-PON of claim 1, wherein when the ONT controller does not detect the laser set-up information then the OLT controller activates and deactivates the Laser shutdown function in a different predetermined sequence to generate different laser set-up information.

3. The WDM-PON of claim 1, wherein when the OLT receiver detects a laser signal from the ONT laser this is indicative that a laser set-up procedure has been completed and then the OLT controller activates a bi-directional data channel on the optical layer between the OLT, the at least one wavelength splitter, and the ONT.

4. The method of claim 3, wherein the laser set-up information comprises at least one of:
   laser wavelength tuning information; and
   laser power information.

5. The WDM-PON of claim 1, wherein when the OLT receiver detects a laser signal from the ONT laser then the OLT controller activates and deactivates the Laser shutdown function in a different predetermined sequence to generate fine-tuned laser set-up information.

6. The WDM-PON of claim 1, wherein the OLT controller controls the OLT laser to repeat the generating and communicating of the laser set-up information.

7. The WDM-PON of claim 1, wherein the OLT controller activates and deactivates the Laser shutdown function in the predetermined sequence based on an eight bit field to generate the laser set-up information when the ONT laser has a discrete number of wavelength states.

8. The WDM-PON of claim 1, wherein the OLT controller activates and deactivates the Laser shutdown function in the predetermined sequence based on more than eight bits to generate the laser set-up information when the ONT laser has a continuous number of wavelength states.

9. The WDM-PON of claim 1, wherein the laser set-up information comprises at least one of:
   laser wavelength tuning information; and
   laser power information.

10. The WDM-PON of claim 1, wherein:
    the communications channel is not used at a same time as a bi-directional data channel, and
    the laser set-up information is transmitted at a different date rate than a data rate of data on the bi-directional data channel.

11. A method for setting-up an optical network termination (ONT) laser by establishing a communications channel on an optical layer in a wavelength-multiplexed passive optical network (WDM-PON) wherein the WDM-PON comprises:
    an optical network termination (ONT) comprising an ONT controller and an optical port which has an ONT transmitter and an ONT receiver, where the ONT transmitter comprises an ONT laser and the ONT receiver comprises an ONT Signal detect function;
    at least one wavelength splitter;
    an optical line terminal (OLT) comprising an OLT controller and an optical port which has an OLT receiver and an OLT transmitter where the OLT transmitter comprises an OLT laser and a Laser shutdown function, wherein when the OLT controller deactivates the Laser shutdown function then the OLT laser is turned-on and provides an optical power which corresponds to a logical level 1 at the ONT Signal detect function, wherein when the OLT controller activates the Laser shutdown function then the OLT laser is turned-off and provides an optical power which corresponds to a logical level 0 at the ONT Signal detect function;
    the method comprising the steps of:
    generating laser set-up information by having the OLT controller activate and deactivate the Laser shutdown function in a predetermined sequence;
    transporting the laser set-up information on the communication channel over the optical layer via the at least one wavelength splitter, where the communication channel was established by the Laser shutdown function and the ONT Signal detect function;
    receiving the laser set-up information by having the ONT controller monitor the ONT Signal detect function; and
    using the received laser set-up information to set-up the ONT laser.

12. The method of claim 11, further comprising the step of generating different laser set-up information by having the OLT controller activate and deactivate the Laser shutdown function in a different predetermined sequence when the ONT controller does not receive the laser set-up information.

13. The method of claim 11, further comprising the step of activating a bi-directional data channel on the optical layer between the OLT, the at least one wavelength splitter, and the ONT after the OLT receiver detects a laser signal from the ONT laser.

14. The method of claim 11, further comprising the step of generating fine-tuned laser set-up information by having the OLT controller activate and deactivate the Laser shutdown function in a different predetermined sequence after the OLT receiver detects a laser signal from the ONT laser.

15. The method of claim 11, further comprising the step of repeating the generating of the laser set-up information by having the OLT controller control the activating and deactivating of the Laser shutdown function.

16. The method of claim 11, wherein the OLT controller activates and deactivates the Laser shutdown function in the predetermined sequence based on an eight bit field to generate the laser set-up information when the ONT laser has a discrete number of wavelength states.

17. The method of claim 11, wherein the OLT controller activates and deactivates the Laser shutdown function in the predetermined sequence based on more than eight bits to generate the laser set-up information when the ONT laser has a continuous number of wavelength states.

18. The method of claim 11, wherein the laser set-up information comprises at least one of:
   laser wavelength tuning information; and
   laser power information.

19. The method of claim 11, wherein:
   the communications channel is not used at a same time as a bi-directional data channel, and
   the laser set-up information is transmitted at a different date rate than a data rate of data on the bi-directional data channel.

20. An optical line terminal (OLT) for setting-up an optical network termination (ONT) laser within an optical network termination (ONT), the OLT comprising:
   an OLT controller;
   an optical port comprising an OLT receiver and an OLT transmitter, where the OLT transmitter comprises an OLT laser and a Laser shutdown function;
   wherein the OLT controller deactivates the Laser shutdown function then the OLT laser is turned-on and provides an optical power which corresponds to a logical level 1 at an ONT Signal detect function within the ONT;
   wherein the OLT controller activates the Laser shutdown function then the OLT laser is turned-off and provides an optical power which corresponds to a logical level 0 at the ONT Signal detect function; and
   wherein the OLT controller activates and deactivates the Laser shutdown function in a predetermined sequence to generate laser set-up information which is transported in a communications channel over an optical layer to the ONT, where the communication channel was established by the Laser shutdown function and the ONT Signal detect function.

21. The OLT of claim 20, wherein the laser set-up information comprises at least one of:
   laser wavelength tuning information; and
   laser power information.

22. An optical network termination (ONT) for setting-up an ONT laser by interacting with an optical line terminal (OLT), the ONT comprising:
   an ONT controller;
   an optical port with an ONT transmitter which comprises the ONT laser and an ONT receiver which comprises an ONT Signal detect function;
   wherein the ONT controller monitors the ONT Signal detect function to detect laser set-up information that was generated by the OLT when an OLT controller activated and deactivated a Laser shutdown function in a predetermined sequence to respectively turn-off an OLT laser and turn-on the OLT laser to generate the laser set-up information; and
   wherein the ONT controller uses the detected laser set-up information to set-up the ONT laser.

23. The ONT of claim 22, wherein the laser set-up information comprises at least one of:
   laser wavelength tuning information; and
   laser power information.

24. A method implemented by an optical line terminal (OLT) for setting-up an optical network termination (ONT) laser within an optical network termination (ONT), the OLT comprising:
   an OLT controller;
   an optical port comprising an OLT receiver and an OLT transmitter, where the OLT transmitter comprises an OLT laser and a Laser shutdown function;
   wherein the OLT controller deactivates the Laser shutdown function then the OLT laser is turned-on and provides an optical power which corresponds to a logical level 1 at an ONT Signal detect function within the ONT;
   wherein the OLT controller activates the Laser shutdown function then the OLT laser is turned-off and provides an optical power which corresponds to a logical level 0 at the ONT Signal detect function; and
   the method comprising:
   activating and deactivating the Laser shutdown function in a predetermined sequence to generate laser set-up information which is transported in a communications channel over an optical layer to the ONT, where the communication channel was established by the Laser shutdown function and the ONT Signal detect function.

25. A method implemented by an optical network termination (ONT) for setting-up an ONT laser by interacting with an optical line terminal (OLT), the ONT comprising:
   an ONT controller;
   an optical port with an ONT transmitter which comprises the ONT laser and an ONT receiver which comprises an ONT Signal detect function;
   the method comprising:
   monitoring the ONT Signal detect function to detect laser set-up information that was generated by the OLT when an OLT controller activated and deactivated a Laser shutdown function in a predetermined sequence to respectively turn-off an OLT laser and turn-on the OLT laser to generate the laser set-up information; and
   setting-up the ONT laser utilizing the detected laser set-up information.

26. The method of claim 25, wherein the laser set-up information comprises at least one of:
   laser wavelength tuning information; and
   laser power information.

* * * * *

UNITED STATES PATENT AND TRADEMARK OFFICE
CERTIFICATE OF CORRECTION

PATENT NO.        : 8,744,263 B2
APPLICATION NO.   : 13/132536
DATED             : June 3, 2014
INVENTOR(S)       : Ohlen et al.

Page 1 of 1

It is certified that error appears in the above-identified patent and that said Letters Patent is hereby corrected as shown below:

In the Specification:

In Column 5, Line 18, delete "OLT controller 108" and insert -- OLT controller 120 --, therefor.

In Column 5, Line 40, delete "OLT controller 108" and insert -- OLT controller 120 --, therefor.

In Column 6, Lines 6-7, delete "OLT controller 108" and insert -- OLT controller 120 --, therefor.

In the Claims:

In Column 9, Line 59, in Claim 4, delete "method" and insert -- WDM-PON --, therefor.

Signed and Sealed this
Sixteenth Day of September, 2014

Michelle K. Lee
*Deputy Director of the United States Patent and Trademark Office*